United States Patent
Chan

(10) Patent No.: US 10,749,444 B1
(45) Date of Patent: Aug. 18, 2020

(54) POWER SUPPLY CIRCUIT CAPABLE OF SETTING TURN-OFF POINT

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/575,367

(22) Filed: Sep. 18, 2019

(30) Foreign Application Priority Data

May 29, 2019 (TW) .............................. 108118512 A

(51) Int. Cl.
*H02M 7/217* (2006.01)
*H02M 7/5395* (2006.01)

(52) U.S. Cl.
CPC ....... *H02M 7/2176* (2013.01); *H02M 7/5395* (2013.01)

(58) Field of Classification Search
CPC ...... H02M 7/21; H02M 7/217; H02M 7/2176; H02M 7/5395; H02M 7/539
See application file for complete search history.

(56) References Cited

U.S. PATENT DOCUMENTS

| | | | |
|---|---|---|---|
| 6,198,198 B1 * | 3/2001 | Fujimura | H05B 41/3925 310/316.01 |
| 6,239,558 B1 * | 5/2001 | Fujimura | H01L 41/044 310/318 |
| 10,171,002 B2 | 1/2019 | Arimoto | |
| 10,230,303 B2 | 3/2019 | Malinin | |
| 10,587,199 B1 * | 3/2020 | Chan | H02M 3/33523 |
| 2016/0373011 A1 * | 12/2016 | Kawashima | H02M 1/32 |
| 2018/0083477 A1 * | 3/2018 | Tian | H02J 7/027 |
| 2018/0191255 A1 * | 7/2018 | Mizoe | H02M 1/08 |
| 2019/0334428 A1 * | 10/2019 | Arima | H02M 1/32 |
| 2020/0112265 A1 * | 4/2020 | Hara | H02M 1/08 |

FOREIGN PATENT DOCUMENTS

| | | |
|---|---|---|
| CN | 106169870 A | 11/2016 |
| CN | 106992671 A | 7/2017 |
| TW | M423401 U1 | 2/2012 |
| TW | 201531003 A | 8/2015 |

\* cited by examiner

*Primary Examiner* — Adolf D Berhane
(74) *Attorney, Agent, or Firm* — Winston Hsu

(57) ABSTRACT

A power supply circuit includes a transformer, a PWM IC, an input voltage detecting circuit, a detecting voltage adjusting circuit, and a driving voltage supply circuit. The transformer is configured to receive an input voltage on a primary side and provide an output voltage on a secondary side. The PWM IC is configured to activate the driving voltage according to a first detecting voltage and a second detecting voltage. The input voltage detecting circuit is disposed on the primary side of the transformer and configured to provide a first voltage and a second voltage associated with the input voltage. The detecting voltage adjusting circuit is disposed on the primary side of the transformer and configured to provide the first and the second detecting voltages according to the first and the second voltage. The driving voltage supply circuit is configured to provide the driving voltage for operating the PWM IC.

20 Claims, 3 Drawing Sheets

POWER SUPPLY CIRCUIT CAPABLE OF SETTING TURN-OFF POINT

CROSS REFERENCE TO RELATED APPLICATION

This application claims priority of Taiwan Application No. 108118512 filed on 2019 May 29.

BACKGROUND OF THE INVENTION

1. Field of the Invention

The present invention is related to a power supply circuit, and more particularly, to a power supply circuit capable of setting turn-off point.

2. Description of the Prior Art

Power supply circuits are commonly used to convert alternative-current (AC) power into direct-current (DC) voltages for driving various components in a computer system which may have different operating voltages.

Although a traditional power supply circuit is capable of working properly if the input voltage is anywhere between 100-240V, an input range between 90-264V (with ±10% buffer) is usually adopted in order to accommodate different input voltage standards indifferent countries. Most prior art power supply circuits are designed to shut down their operations when the input voltage drops to 80V, and can thus be turned off prematurely when the mains electricity somehow fluctuates. Under such circumstance, the user needs to replug the power supply circuit to reboot, which takes time and influences the operation of the computer system.

SUMMARY OF THE INVENTION

The present invention provides a power supply circuit capable of setting turn-off point and including a main transformer, a pulse width modulation integrated circuit, an input voltage detecting circuit, a detecting voltage adjusting circuit, and a driving voltage supply circuit. The main transformer includes a primary side for receiving an input voltage and a secondary side for providing an output voltage. The pulse width modulation integrated circuit is configured to activate a driving voltage according to a first detecting voltage and a second detecting voltage. The input voltage detecting circuit is disposed on the primary side of the main transformer and configured to provide a first voltage and a second voltage associated with the input voltage. The detecting voltage adjusting circuit is disposed on the primary side of the main transformer and configured to provide the first detecting voltage and the second detecting voltage according to the first voltage and the second voltage. The driving voltage supply circuit is configured to provide the driving voltage for operating the pulse width modulation integrated circuit.

The present invention also provides a power supply circuit capable of setting turn-off point and including a main transformer, a pulse width modulation integrated circuit, an input voltage detecting circuit, a detecting voltage adjusting circuit, and a driving voltage supply circuit. The main transformer includes a primary side for receiving an input voltage and a secondary side for providing an output voltage. The pulse width modulation integrated circuit is configured to activate a driving voltage according to a first detecting voltage and a second detecting voltage. The input voltage detecting circuit is disposed on the primary side of the main transformer and includes an input capacitor coupled between the input voltage and a ground level; a first diode, a first resistor and a second resistor coupled in series between the input voltage and the ground level for providing a first voltage associated with the input voltage between the first resistor and the second resistor; and a second diode, a third resistor and a fourth resistor coupled in series between the input voltage and the ground level, and coupled in parallel with the first diode, the first resistor and the second resistor for providing a second voltage associated with the input voltage between the third resistor and the fourth resistor. The detecting voltage adjusting circuit is disposed on the primary side of the main transformer and configured to provide the first detecting voltage and the second detecting voltage according to the first voltage and the second voltage, and includes a third diode, a fourth diode, a fifth diode, a Zener diode, a first switch, a second switch, and a third switch. The third diode includes an anode coupled between the first resistor and the second resistor and a cathode. The fourth diode includes an anode coupled between the third resistor and the fourth resistor and a cathode. The fifth diode includes an anode coupled to the pulse width modulation circuit and a cathode. The Zener diode includes an anode coupled to the ground level and a cathode. The first switch includes a first end coupled to the cathode of the fourth diode via the fifth resistor, a second end coupled to the ground level, and a control end. The a second switch includes a first end coupled to the cathode of the fifth diode, a second end coupled to the ground level, and a control end coupled between the first end of the first switch and the fifth resistor. The third switch includes a first end coupled to the cathode of the third diode, a second end coupled to the control end of the first switch, and a control end coupled to the cathode of the Zener diode. The driving voltage supply circuit is configured to provide the driving voltage for operating the pulse width modulation integrated circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
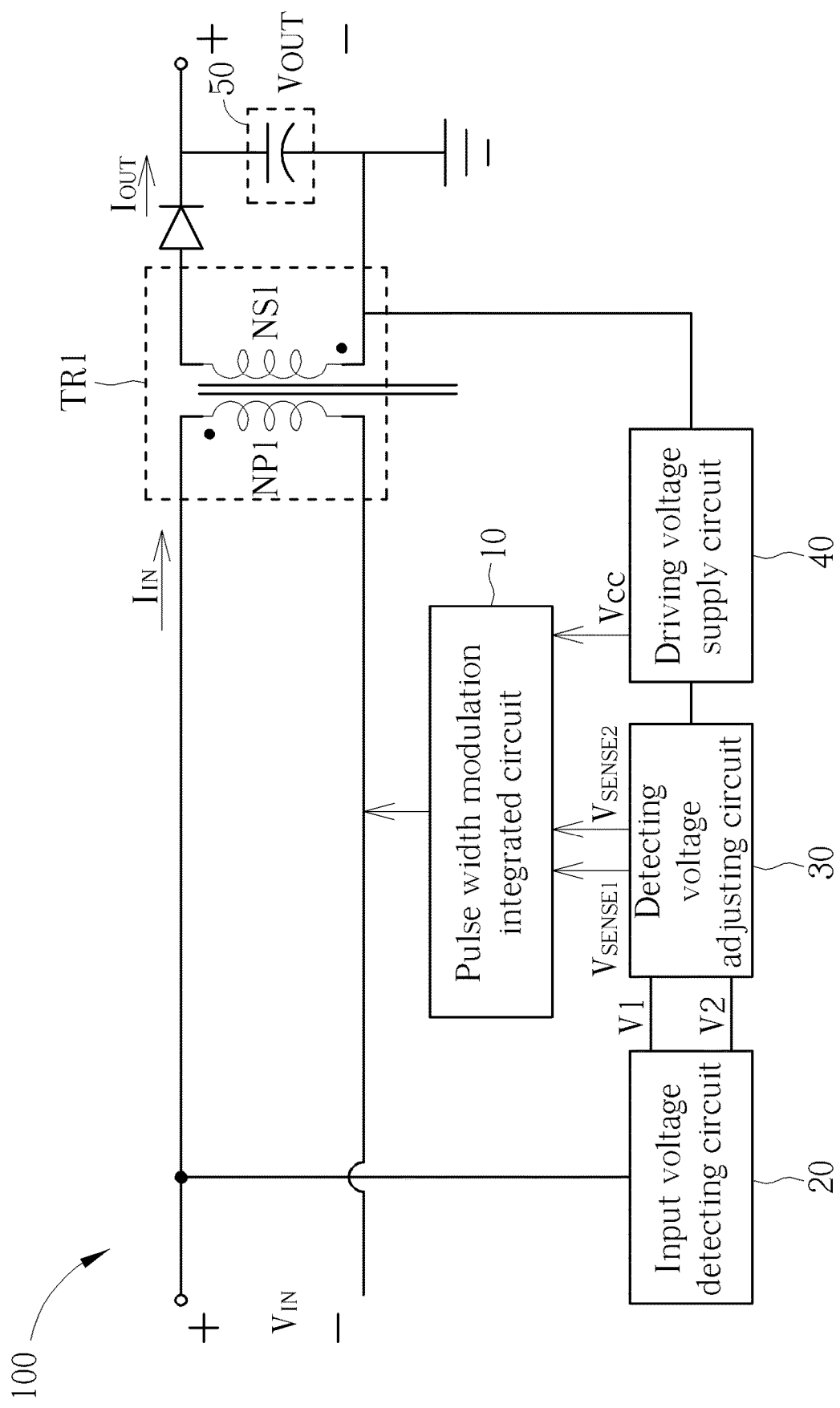
FIG. 1 is a functional diagram illustrating a power supply circuit according to an embodiment of the present invention.

FIG. 1 is a functional diagram illustrating a power supply circuit 100 according to an embodiment of the present invention. The power supply circuit 100 includes a main transformer TR1, a pulse width modulation integrated circuit (PWM IC) 10, an input voltage detecting circuit 20, a detecting voltage adjusting circuit 30, and a driving voltage supply circuit 40. The power supply circuit 100 is configured to convert an input voltage $V_{IN}$ into an output voltage $V_{OUT}$ for driving a load 50.

Figure 2:
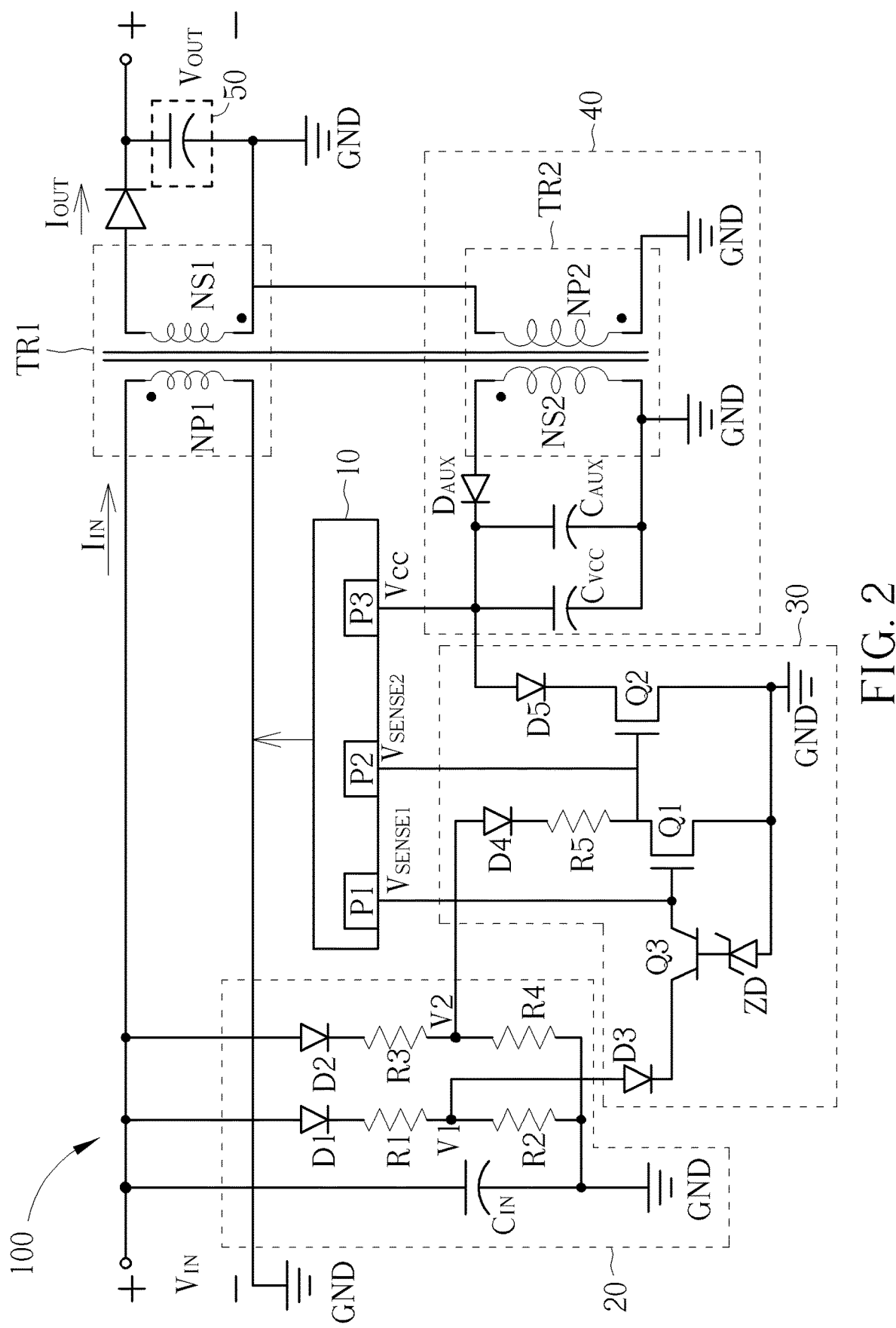
FIG. 2 is a diagram illustrating an implementation of the power supply circuit according to an embodiment of the present invention.

FIG. 2 is a diagram illustrating an implementation of the power supply circuit 100 according to an embodiment of the present invention. The main transformer TR1 includes a primary winding (NP1 turns) coupled to the input voltage $V_{IN}$ and a secondary winding (NS1 turns) coupled to the load 50, wherein $I_{IN}$ represents the input current flowing through the primary side of the main transformer TR1, and $I_{OUT}$ represents the output current flowing through the secondary side of the main transformer TR1. Base on Faraday's law of induction, the operation of an ideal transformer may be described by an equation of $V_{IN}/V_{OUT}=I_{OUT}/I_{IN}=NP1/NS1$. In step-up applications, the number of turns in the secondary winding NS1 is larger than the number of turns in the primary winding NP1. In step-down applications, the number of turns in the primary winding NP1 is larger than the number of turns in the secondary winding NS1. However, the number of turns in the primary or second winding does not limit the scope of the present invention.

The pulse width modulation integrated circuit 10 includes 3 pins P1~P3, wherein Pin P1 is used to receive a detecting voltage $V_{SENSE1}$/Pin P2 is used to receive a detecting voltage $V_{SENSE2}$, and Pin P3 is coupled to the driving voltage supply circuit 40 for receiving a driving voltage $V_{CC}$ required to operate the pulse width modulation integrated circuit 10. The pulse width modulation integrated circuit 10 is configured to activate the driving voltage $V_{CC}$ according to detecting voltages $V_{SENSE1}$ and $V_{SENSE2}$. When in operation, the pulse width modulation integrated circuit 10 may regulate the input current $I_{IN}$ flowing through the primary side of the main transformer TR1, thereby allowing the power supply circuit 100 to operate in different modes.

The input voltage detecting circuit 20 is disposed on the primary side of the main transformer TR1 and includes an input capacitor $C_{IN}$, resistors R1~R4, and diodes D1~D2. The resistor R1, the resistor R2 and the diode D1 is coupled in series, thereby forming a voltage-dividing circuit between the input voltage $V_{IN}$ and a ground level GND. The resistor R3, the resistor R4 and the diode D2 is coupled in series, thereby forming a voltage-dividing circuit between the input voltage $V_{IN}$ and the ground level GND. More specifically, the voltage V1 established between the resistors R1 and R2 and the voltage V2 established between the resistors R3 and R4 may reflect the level of the input voltage $V_{IN}$.

The detecting voltage adjusting circuit 30 includes switches Q1~Q3, a resistor R5, a Zener diode ZD, and diodes D3-D5. The switch Q1 includes a first end coupled between the resistors R3 and R4 in the input voltage detecting circuit 20 via the resistor R5 and the diode D4, a second end coupled to the ground level GND, and a control end coupled to Pin P1 of the pulse width modulation integrated circuit 10 for receiving the detecting voltage $V_{SENSE1}$. The switch Q2 includes a first end coupled to the driving voltage supply circuit 40 via the diode D5, a second end coupled to the ground level GND, and a control end coupled to the first end of the switch Q1 and Pin P2 of the pulse width modulation integrated circuit 10. The switch Q3 includes a first end coupled between the resistors R1 and R2 in the input voltage detecting circuit 20 via the diode D3, a second end coupled to the control end of the switch Q1, and a control end coupled to the ground level GND via the Zener diode ZD. The detecting voltage adjusting circuit 30 is configured to provide the detecting voltages $V_{SENSE1}$ and $V_{SENSE2}$ according to the voltages V1 and V2 provided by the input voltage detecting circuit 20, and its operation will be described in more details in subsequent paragraphs.

The driving voltage supply circuit 40 includes a supply capacitor $C_{VCC}$, an auxiliary transformer TR2, an auxiliary capacitor $C_{AUX}$, and an auxiliary diode $D_{AUX}$. The auxiliary transformer TR2 includes a primary winding (NP2 turns) and a secondary winding (NS2 turns). The primary winding of the auxiliary transformer TR2 is coupled to the secondary side of the main transformer TR1 for charging the auxiliary capacitor $C_{AUX}$ when the output voltage $V_{OUT}$ is not zero, thereby establishing the driving voltage $V_{CC}$ on the auxiliary capacitor $C_{AUX}$ for operating the pulse width modulation circuit 10.

In an embodiment of the present invention, each of the switches Q1 and Q2 may be a metal-oxide-semiconductor field-effect transistor (MOSFET) or another device with similar function. The switch Q3 may be a bipolar junction transistor (BJT) or another device with similar function. However, the types of the switches Q1~Q3 do not limit the scope of the present invention.

In an embodiment of the present invention, the value of the input capacitor $C_{IN}$ may be 120 μF, the value of the auxiliary capacitor $C_{AUX}$ may be 47 μF, the value of the supply capacitor $C_{VCC}$ may be 47 μF, the value of the resistor R1 may be 300KΩ, the value of the resistor R2 may be 99KΩ, the value of the resistor R3 may be 200KΩ, the value of the resistor R4 may be 100KΩ, and the value of the resistor R5 may be 10KΩ. However, the values of the above-mentioned devices do not limit the scope of the present invention.

Figure 3:
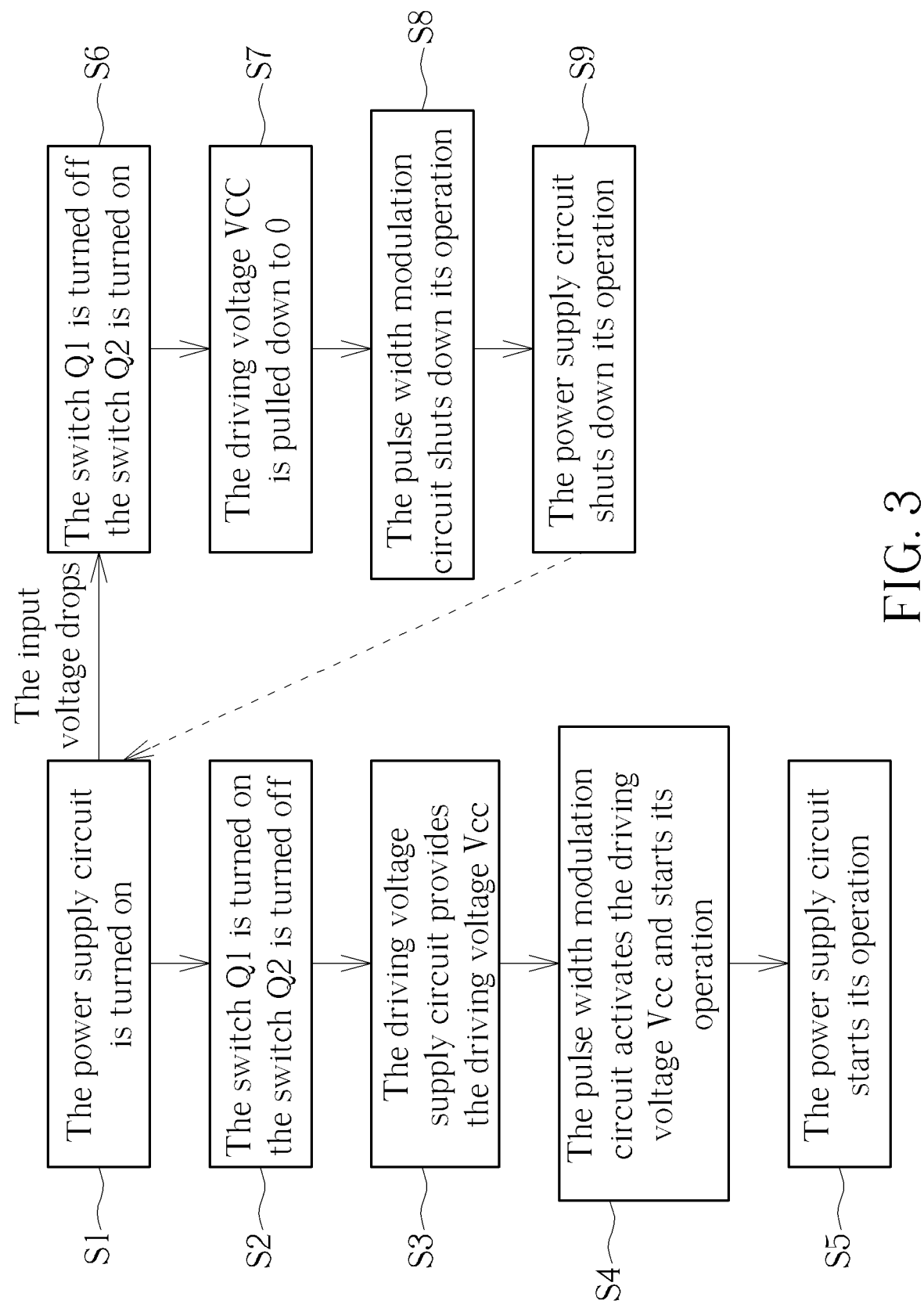
FIG. 3 is a state diagram illustrating the operation of the power supply circuit according to an embodiment of the present invention.

FIG. 3 is a state diagram illustrating the operation of the power supply circuit 100 according to an embodiment of the present invention. For illustrative purpose, FIG. 3 depicts the states S1~S9 associated with the present invention. However, the operation of the power supply circuit 100 may include other states.

In state S1, the power supply circuit 100 is turned on. For illustrative purpose, it is assumed that the input voltage $V_{IN}$ of the power supply circuit 100 is 90V after turning on.

In state S2, the input capacitor $C_{IN}$ in the input voltage detecting circuit 20 is charged by the input voltage $V_{IN}$. Once the input capacitor $C_{IN}$ is fully charged, the voltages V1 and V2 (such as 20V) may be established across the resistors R2 and R4, wherein the forward-biased diode D3 is conducting and the reverse-biased Zener diode ZD provides a break-down voltage (such as 15V) which thus turns on the switch Q3. Under such circumstance, the switch Q1 is turned on when its first end and its control end are pulled to a high voltage level, and the switch Q2 is turned off when its control end is pulled downed to a low voltage level by the conducting switch Q1. Meanwhile, the detecting voltage $V_{SENSE1}$ has a high voltage level, and the detecting voltage $V_{SENSE2}$ has a low voltage level.

In state S3, the auxiliary transformer TR2 of the driving voltage supply circuit 40 is used to charge the auxiliary capacitor $C_{AUX}$, thereby establishing the driving voltage $V_{CC}$ on the supply capacitor $C_{VCC}$ for operating the pulse width modulation circuit 10.

In state S4, when receiving the detecting voltage $V_{SENSE1}$ having a high voltage level at its Pin P1 and receiving the detecting voltage $V_{SENSE2}$ having a low voltage level at its Pin P2, the pulse width modulation circuit 10 is configured to activate the driving voltage $V_{CC}$ provided by the driving voltage supply circuit 40 and starts its operation.

In state S5, after the pulse width modulation circuit 10 starts its operation, the power supply circuit 100 also starts its operation, thereby converting the input voltage $V_{IN}$ into the output voltage $V_{OUT}$ for driving the load 50.

In state S6, when the input voltage $V_{IN}$ somehow drops to a value which is insufficient to break down the Zener diode ZD (such as 60V), the switch Q1 is turned off due to insufficient voltage V2, and the switch Q2 is turned on by its control end at a high voltage level. Meanwhile, the detecting voltage $V_{SENSE1}$ has a low voltage level, and the detecting voltage $V_{SENSE2}$ has a high voltage level.

In state S7, the driving voltage $V_{CC}$ is pulled down to the ground level GND by the conducting switch Q2.

In state S8, when receiving the detecting voltage $V_{SENSE1}$ having a low voltage level at its Pin P1 and receiving the detecting voltage $V_{SENSE2}$ having a high voltage level at its Pin P2, the pulse width modulation circuit 10 is configured to shut down its operation.

In state S9, after the pulse width modulation circuit 10 shuts down its operation, the power supply circuit 100 also shuts down its operation.

In the present invention, the power supply circuit 10 provides the flexibility of setting multiple turn-off points. For example, if it is desired for the power supply circuit 10 to shut down at $V_{IN}$=60V, the values of the resistors in the voltage detecting circuit 20 may be chosen so that the voltage V1 established across the resistor R2 drops below 15V when $V_{IN}$=60V, thereby shutting down the power supply circuit 10 at $V_{IN}$=60V.

In conclusion, the present power supply circuit uses the input voltage detecting circuit to monitor the input voltage. The detecting voltage adjusting circuit may adjust the detecting signals when detecting a low input voltage so that the pulse width modulation can deactivate its driving voltage, thereby shutting down the power supply circuit. Therefore, the present power supply circuit 100 is able to shut down flexibly at multiple turn-off points, instead of the prior art single turn-off point which may be prematurely triggered by temporary fluctuations of the mains electricity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply circuit capable of setting turn-off point, comprising:
   a main transformer, comprising:
      a primary side for receiving an input voltage; and
      a secondary side for providing an output voltage;
   a pulse width modulation integrated circuit configured to activate a driving voltage according to a first detecting voltage and a second detecting voltage;
   an input voltage detecting circuit disposed on the primary side of the main transformer and configured to provide a first voltage and a second voltage associated with the input voltage;
   a detecting voltage adjusting circuit disposed on the primary side of the main transformer and configured to provide the first detecting voltage and the second detecting voltage according to the first voltage and the second voltage; and
   a driving voltage supply circuit configured to provide the driving voltage for operating the pulse width modulation integrated circuit.

2. The power supply circuit of claim 1, wherein the input voltage detecting circuit includes:
   an input capacitor coupled between the input voltage and a ground level;
   a first diode, a first resistor and a second resistor coupled in series between the input voltage and the ground level; and
   a second diode, a third resistor and a fourth resistor coupled in series between the input voltage and the ground level, and coupled in parallel with the first diode, the first resistor and the second resistor.

3. The power supply circuit of claim 1, wherein the detecting voltage adjusting circuit includes:
   a third diode, comprising:
      an anode coupled to the first voltage provided by the input voltage detecting circuit; and
      a cathode;
   a fourth diode, comprising:
      an anode coupled to the second voltage provided by the input voltage detecting circuit; and
      a cathode;
   a fifth diode, comprising:
      an anode coupled to the driving voltage supply circuit; and
      a cathode;
   a Zener diode, comprising:
      an anode coupled to a ground level; and
      a cathode;
   a fifth resistor;
   a first switch, comprising:
      a first end coupled to the cathode of the fourth diode via the fifth resistor;
      a second end coupled to the ground level; and
      a control end;
   a second switch, comprising:
      a first end coupled to the cathode of the fifth diode;
      a second end coupled to the ground level; and
      a control end coupled between the first end of the first switch and the fifth resistor; and
   a third switch, comprising:
      a first end coupled to the cathode of the third diode;
      a second end coupled to the control end of the first switch; and
      a control end coupled to the cathode of the Zener diode.

4. The power supply circuit of claim 3, wherein the pulse width modulation circuit includes:
   a first pin coupled to the control end of the first switch and the second end of the third switch; and
   a second pin coupled to the first end of the first switch and the control end of the second switch.

5. The power supply circuit of claim 3, wherein the first switch and the second switch are metal-oxide-semiconductor field-effect transistors (MOSFETs).

6. The power supply circuit of claim 3, wherein the third switch is a bipolar junction transistor (BJT).

7. The power supply circuit of claim 1, wherein the driving voltage supply circuit includes:
   an auxiliary diode, comprising:
      an anode; and
      a cathode coupled to the pulse width modulation circuit;
   a supply capacitor, comprising
      a first end coupled to the pulse width modulation circuit; and
      a second end coupled to a ground level;
   an auxiliary capacitor, comprising
      a first end coupled to the pulse width modulation circuit; and
      a second end coupled to the ground level; and
   an auxiliary transformer, comprising:
      a primary side coupled to the secondary side of the main transformer; and a secondary side for providing the driving voltage by charging the auxiliary capacitor and the supply capacitor according to the output voltage.

8. The power supply circuit of claim 7, wherein the pulse width modulation circuit includes a third pin coupled to the first end of the supply capacitor, the first end of the auxiliary capacitor, and the cathode of the auxiliary diode.

9. The power supply circuit of claim 1, wherein:
the detecting voltage adjusting circuit is configured to provide the first detecting voltage having a first voltage level and the second detecting voltage having a second voltage level when the first voltage and the second voltage are larger than or equal to a predetermined value;
the detecting voltage adjusting circuit is configured to provide the first detecting voltage having the second voltage level and the second detecting voltage having the first voltage level when the first voltage and the second voltage are smaller than the predetermined value; and
the first voltage level is different from the second voltage level.

10. The power supply circuit of claim 9, wherein the detecting voltage adjusting circuit is further configured to pull down the driving voltage to a ground level when the first voltage and the second voltage are smaller than the predetermined value.

11. The power supply circuit of claim 9, wherein the pulse width modulation circuit is configured to start its operation by activating the driving voltage when receiving the first detecting voltage having the first voltage level and the second detecting voltage having the second voltage level.

12. The power supply circuit of claim 9, wherein the pulse width modulation circuit is configured to shut down its operation when receiving the first detecting voltage having the second voltage level and the second detecting voltage having the first voltage level.

13. A power supply circuit capable of setting turn-off point, comprising:
a main transformer, comprising:
a primary side for receiving an input voltage; and
a secondary side for providing an output voltage;
a pulse width modulation integrated circuit configured to activate a driving voltage according to a first detecting voltage and a second detecting voltage;
an input voltage detecting circuit disposed on the primary side of the main transformer and comprising:
an input capacitor coupled between the input voltage and a ground level;
a first diode, a first resistor and a second resistor coupled in series between the input voltage and the ground level for providing a first voltage associated with the input voltage between the first resistor and the second resistor; and
a second diode, a third resistor and a fourth resistor coupled in series between the input voltage and the ground level, and coupled in parallel with the first diode, the first resistor and the second resistor for providing a second voltage associated with the input voltage between the third resistor and the fourth resistor;
a detecting voltage adjusting circuit disposed on the primary side of the main transformer and configured to provide the first detecting voltage and the second detecting voltage according to the first voltage and the second voltage, and comprising:
a third diode, comprising:
an anode coupled between the first resistor and the second resistor; and
a cathode;
a fourth diode, comprising:
an anode coupled between the third resistor and the fourth resistor; and
a cathode;
a fifth diode, comprising:
an anode coupled to the pulse width modulation circuit; and
a cathode;
a Zener diode, comprising:
an anode coupled to the ground level; and
a cathode;
a fifth resistor;
a first switch, comprising:
a first end coupled to the cathode of the fourth diode via the fifth resistor;
a second end coupled to the ground level; and
a control end;
a second switch, comprising:
a first end coupled to the cathode of the fifth diode;
a second end coupled to the ground level; and
a control end coupled between the first end of the first switch and the fifth resistor; and
a third switch, comprising:
a first end coupled to the cathode of the third diode;
a second end coupled to the control end of the first switch; and
a control end coupled to the cathode of the Zener diode; and
a driving voltage supply circuit configured to provide the driving voltage for operating the pulse width modulation integrated circuit.

14. The power supply circuit of claim 13, wherein the driving voltage supply circuit includes:
an auxiliary diode, comprising:
an anode; and
a cathode coupled to the pulse width modulation circuit;
a supply capacitor, comprising
a first end coupled to the pulse width modulation circuit; and
a second end coupled to the ground level;
an auxiliary capacitor, comprising
a first end coupled to the pulse width modulation circuit; and
a second end coupled to the ground level; and
an auxiliary transformer, comprising:
a primary side coupled to the secondary side of the main transformer; and
a secondary side for providing the driving voltage by charging the auxiliary capacitor and the supply capacitor according to the output voltage.

15. The power supply circuit of claim 14, wherein the pulse width modulation circuit includes:
a first pin coupled to the control end of the first switch and the second end of the third switch;
a second pin coupled to the first end of the first switch and the control end of the second switch; and
a third pin coupled to the first end of the supply capacitor, the first end of the auxiliary capacitor, and the cathode of the auxiliary diode.

16. The power supply circuit of claim 13, wherein:
the detecting voltage adjusting circuit is configured to provide the first detecting voltage having a first voltage level and the second detecting voltage having a second voltage level when the first voltage and the second voltage are larger than or equal to a predetermined value;

the detecting voltage adjusting circuit is configured to provide the first detecting voltage having the second voltage level and the second detecting voltage having the first voltage level when the first voltage and the second voltage are smaller than the predetermined value; and the first voltage level is different from the second voltage level.

17. The power supply circuit of claim 16, wherein the detecting voltage adjusting circuit is further configured to pull down the driving voltage to the ground level when the first voltage and the second voltage are smaller than the predetermined value.

18. The power supply circuit of claim 16, wherein the pulse width modulation circuit is configured to start its operation by activating the driving voltage when receiving the first detecting voltage having the first voltage level and the second detecting voltage having the second voltage level.

19. The power supply circuit of claim 16, wherein the pulse width modulation circuit is configured to shut down its operation when receiving the first detecting voltage having the second voltage level and the second detecting voltage having the first voltage level.

20. The power supply circuit of claim 13, wherein the first switch and the second switch are metal-oxide-semiconductor field-effect transistors (MOSFET) and the third switch is a bipolar junction transistor (BJT).

\* \* \* \* \*